United States Patent [19]

Clabburn

[11] 4,424,411
[45] Jan. 3, 1984

[54] CONNECTOR

[75] Inventor: Robin J. T. Clabburn, Menlo Park, Calif.

[73] Assignee: Raychem Limited, London, England

[21] Appl. No.: 100,985

[22] Filed: Dec. 6, 1979

[30] Foreign Application Priority Data

Dec. 6, 1978 [GB] United Kingdom ............... 47370/78

[51] Int. Cl.³ .............................................. H01R 4/58
[52] U.S. Cl. .................................... 174/84 R; 29/871;
174/DIG. 8; 285/381; 403/273
[58] Field of Search ............ 174/DIG. 8, 84 R, 84 C,
174/84 S, 75 R, 77 R, 79, 99 E, 21 R, 88 C;
285/DIG. 7, 381; 29/451, 450, 869, 871; 339/64
R, 64 M, 30, DIG. 1, 255 P; 403/273

[56] References Cited

U.S. PATENT DOCUMENTS

| 2,229,006 | 1/1941 | Rudd ................................. 174/99 E |
| 3,174,851 | 3/1965 | Buehler et al. . |
| 3,351,463 | 11/1967 | Rozner et al. . |
| 3,513,429 | 5/1970 | Helsop ........................... 285/DIG. 7 |
| 3,713,075 | 1/1973 | Clark ................................. 174/99 E |
| 3,753,700 | 8/1973 | Harrison et al. . |
| 3,759,552 | 9/1973 | Levinsohn et al. . |
| 3,783,037 | 1/1974 | Brook et al. . |
| 3,872,237 | 3/1975 | Eyre et al. ......................... 174/88 C |
| 3,936,590 | 2/1976 | Albano ........................... 174/77 R X |
| 3,944,716 | 3/1976 | Katzbeck ........................... 174/21 R |
| 3,951,712 | 4/1976 | Nakata ........................... 174/84 R X |
| 4,019,925 | 4/1977 | Nenno et al. . |
| 4,036,669 | 7/1977 | Brook et al. . |
| 4,067,752 | 1/1978 | Brook et al. . |
| 4,095,999 | 6/1978 | Brook et al. . |
| 4,135,743 | 1/1979 | Hughes ..................... 174/DIG. 8 X |

FOREIGN PATENT DOCUMENTS

| 647627 | 11/1948 | United Kingdom . |
| 639575 | 6/1950 | United Kingdom ............. 174/84 R |
| 979833 | 1/1965 | United Kingdom ......... 174/DIG. 8 |
| 1327441 | 8/1973 | United Kingdom . |
| 1327442 | 8/1973 | United Kingdom . |
| 1468370 | 2/1974 | United Kingdom . |
| 1395601 | 5/1975 | United Kingdom . |
| 1420682 | 1/1976 | United Kingdom . |
| 1488393 | 10/1977 | United Kingdom . |
| 1504707 | 3/1978 | United Kingdom . |
| 1518788 | 7/1978 | United Kingdom ................ 285/381 |
| 1548964 | 7/1979 | United Kingdom . |
| 1553427 | 9/1979 | United Kingdom . |
| 1554431 | 10/1979 | United Kingdom . |
| 1554432 | 10/1979 | United Kingdom . |

Primary Examiner—Howard N. Goldberg
Assistant Examiner—Carl J. Arbes
Attorney, Agent, or Firm—Lyon & Lyon

[57] ABSTRACT

A device for forming a mechanical and/or electrical connection between a plurality of elongate objects 1, 2, for example bus bars in electrical switchgear, comprises one or more inserts or shell members 9, 10 that can be positioned about the ends of the objects to form a tubular assembly extending between the objects.

One or more memory metal drivers in the form of bands or rings 7, 8 may be provided for retaining the tubular assembly in position and forcing the shell portions against the objects 1, 2 so that a good electrical contact is formed. Preferably an annular protuberance or contact surface 12 is provided on the internal surface of the shell members 9, 10 at each end thereof, and are preferably arranged so as to be partly flattened as the bonds or rings 7, 8 contract, thereby increasing the contact area between the shell members and the objects 1, 2.

8 Claims, 7 Drawing Figures

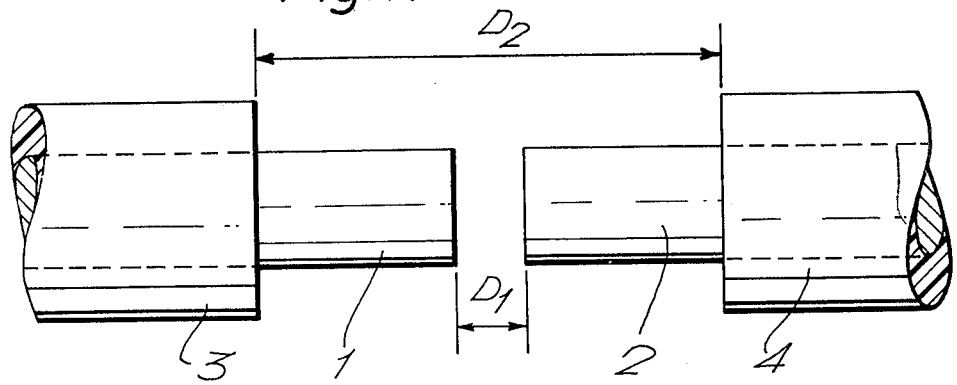
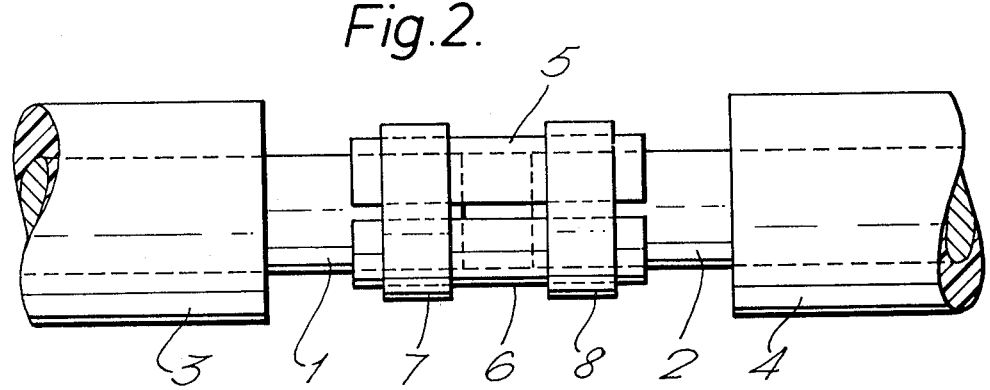
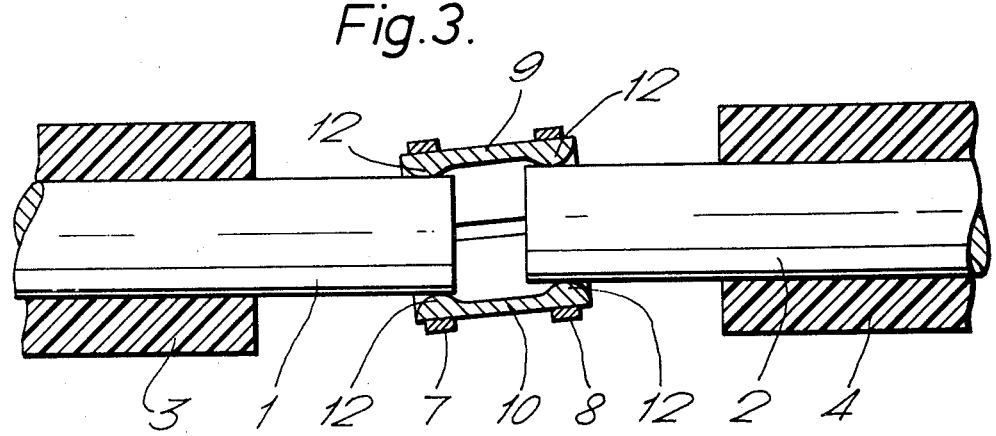

U.S. Patent  Jan. 3, 1984  Sheet 2 of 2  4,424,411

CONNECTOR

This invention relates to memory metals and articles made therefrom, especially heat-recoverable articles such as connectors.

As is known, "memory metals", sometimes also called "memory alloys" are metallic materials from which a heat-recoverable article can be made, that is an article which can be deformed from an original heat stable configuration to a different heat unstable configuration in which it will remain until raised above a temperature (or through a narrow temperature range) known as the transition temperature, when it will return or attempt to return towards its original configuration. It will be understood that the heat-recoverable article is capable of returning towards its original configuration without the further application of outside force.

Further information relating to such metals and their applications may be obtained by reference to U.S. Pat. Nos. 3,174,851; 3,351,463; 3,753,700; 3,759,552; 3,783,037; 4,019,925; 4,036,660; 4,067,752; 4,095,999 and U.K. Pat. Nos. 1,327,441; 1,327,442; 1,395,601; 1,488,393; 1,420,682; 1,504,707; 1,553,427; 1,548,964; 1,554,431; 1,554,432; and 1,554,423, the disclosures of which are incorporated herein by reference.

According to one aspect, the present invention provides an insert, or a plurality of insert members which can be assembled to form an insert, adapted to be positioned within at least one heat shrinkable driver composed of memory metal to provide a coupling for connecting the ends of a plurality of elongate substrates, said insert having a plurality of generally tubular open end sections for receiving the ends of substrates to be connected, characterised in that at least 1 of said open end sections comprises an axially extending contact portion having a smooth interior surface at least a substantial proportion of which is convex in axial cross-section, so that the volume enclosed by said portion has an axially varying cross-sectional area which gradually decreases from a first value adjacent the open end to a minimum value and then increases to a second value remote from the open end, said contacting portion defining the open end or being separated therefrom only by a terminal portion whose transverse cross-sectional area is at all points at least as large as said first value.

Thus, a connection may be formed between a plurality of elongate substrates by positioning about the substrates, an insert or a plurality of insert members according to the invention so that the insert of the insert so formed contacts a substrate at each generally tubular open end section thereof, positioning one or more heat-shrinkable drivers about the insert or insert so formed and heating the or each driver so that it shrinks and causes the insert to grip the substrates securely. While it is possible to form a connection using a single insert according to the invention, it is preferred at least in certain cases, for example where the substrates are in a fixed position close to each other, to form the insert in situ by positioning a plurality of insert members about the substrates.

The insert may have a circular or non-circular interior cross-section, and, as will be appreciated from the following discussion, the term "generally tubular" as used herein is not limited to right cylindrical hollow members but also includes members of, for example, square or rectangular interior cross-section or of irregular and of varying cross-section as well as, for example, Y-shape, T-shape and X-shape members.

Preferably, however the insert has a circular exterior cross-section, at least where the or each driver will be in contact with it.

Advantageously, each of the said open end sections comprises an axially extending contact portion as defined above. As stated above, the or each contact portion has a smooth surface, in contrast with the "toothed" or serrated surfaces that have been provided on some connection devices used hitherto. The or each contact portion preferably has a width measured at its base of from 0.1 to 0.25 times the equivalent diameter of the varying cross-sectional area at its minimum value. By "equivalent diameter" is meant the actual diameter if the insert has a circular interior cross-section, or the diameter of a circle having an area equal to the value of the said cross-sectional area if the insert has a non-circular cross section.

The or each contact portion preferably has a height in the range of from 1 to 25 mm, more preferably from 1.2 to 1.75 mm, and especially about 1.5 mm as measured from the interior surface of the part of the insert enclosing a volume of cross-sectional area equal to the said second value. The or each contact portion may in general have an axial cross-section or profile of any shape as long as it is smooth, although it is preferred that the cross-section or profile forms part of a conic-section especially part of a circle. In such a case, the circle preferably has a radius equal to $0.55 \pm 0.1 \times D^2$ where D is the equivalent diameter of the said varying cross-sectional area at its minimum value.

Preferably the contact portion is convex over its entire length transverse to the axis, although in certain cases, for example where the insert has a rectangular cross-section, it may be possible for the part of the contact portion two opposing interior surface to be convex.

According to a second aspect, the present invention provides a device for forming a mechanical and/or electrical connection between two or more elongate substrates or objects, which comprises a plurality of shell members adapted to be positioned about the end of each object to form a generally tubular connection assembly extending between the objects, and a plurality of heat-recoverable bands or rings formed from a memory metal, at least one band or ring being adapted to be positioned about the connection assembly at or adjacent to each end thereof so that recovery of the bands or rings will cause the connection assembly to grip the objects securely.

The present invention also provides a method of forming a mechanical and/or electrical connection between two or more elongate objects, which comprises positioning two or more shell members about the end of each object to form a generally tubular connection assembly extending between the objects positioning a heat-recoverable band or ring formed from a memory metal about the connection assembly at or adjacent to each end thereof and heating the bands or rings to cause them to recover and force the connection assembly to grip the objects securely.

The terms "insert member" and "shell member" are herein used synonymously, as are the terms "driver" and "ring or band". The terms "contact portion" and "annular protuberance" are also used synonymously as are the terms "substrate" and "object". In addition, the term "insert" is used to refer to connection assemblies but also includes connection assemblies formed from a single shell member.

The generally tubular assembly will, in most cases, be formed from two shell members, for example a straight cylindrical tube is conveniently made from two hollow semi-cylindrical shell members. However, in certain applications it may be convenient to form the assembly from three or more shell members. If desired the shell members may be provided with means for engagement with one another to form the assembly.

One advantage of the present invention is that in certain cases it is possible to connect substrates in situ in applications where the close proximity of the substrates being connected and/or other special limitations would preclude the installation of a continuous tubular sleeve. By forming the generally tubular assembly about the substrates after they are in position and by using relatively narrow heat shrinkable bands or rings to provide the essential connecting force severe spatial requirements may be overcome. The rings are positioned about the substrates before the tubular assembly is formed and then positioned about the tubular assembly. One particularly important application of the present invention is in the electrical and mechanical connection of bus bars employed in electrical switchgear to be formed as a prefabricated unit, for example for export purposes and for the bus bars to be present in position in, for example, a block of epoxy resin or polyurethane insulation. Up to now the subsequent electrical connection of the bus bars has been a time consuming and, therefore expensive process. However, as will be discussed later, by using a connector in accordance with the present invention bus bars may readily be electrically and mechanically connected and it has been found that the electrical and other properties of the connection so made are at least equal to, and are generally superior to, the connections made by conventional methods.

In addition, the device according to the invention may be used for connecting substrates other than bus bars, for example motor windings and the like.

In certain preferred embodiments of the present invention, the shell members may be provided internally with means which provide the bearing surface for the objects being connected.

Such a bearing surface may be provided, for example, by an internal annular protuberance on the shell members at or adjacent to the end(s) thereof. The provision of such an annular protuberance may facilitate the secure connection of bus bars which are not completely accurately aligned. The annular protuberances have a smooth and rounded configuration (preferably having a width at their base of at least twice their height) so that a large area of contact is provided between the shell members and the bus bars even when the bus bars are incorrectly aligned; thereby reducing the risk of localized heating even when currents above 20 kA pass through the bus bars.

The shell members may also be provided as their external surfaces with means for accurately locating the heat-shrinkable bands or rings over the annular protuberances.

The use of the preferred device of inserts according to the invention has the advantage that, even though the memory metal drivers exert a considerable force on the connection assembly or insert during recovery, thereby forming a good electrical contact, little or no bending movement is exerted on the substrates even when they are incorrectly aligned.

The device is advantageously arranged so that the annular protuberances will be at least partly flattened against the bus bars when the memory metal rings or bands recover, thereby increasing the contact area between the bus bars and the connection member. Thus, for example, if the metal rings or bands are made from a $\beta$-brass alloy it is possible for them to exert a contact pressure on recovery of over 40,000 p.s.i., even up to 80,000 p.s.i. while if the shell members are formed from solid copper that has been work hardened to an extent, the yield stress of the copper shell member is typically about 20,000 p.s.i.

The degree of flattening of the protuberances or contact portions against the substrate is preferably such that each forms a flat portion along the axis of the insert or shell member of at least 0.05D, preferably at least 0.1D, where D is the equivalent diameter of the conductor. Advantageously the axial length of each flat portion is in the range of from 0.05D to 0.5D, especially from 0.1D to 0.4D in order to give good electrical contact. For a typical device according to the invention, the axial length of each flat portion may, for example be in the range of from 1 to 5 mm, preferably from 2 to 4 mm and especially about 3 mm.

Since a ring or band formed from a heat recoverable $\beta$-brass alloy will typically contract by about 4% when heated, the maximum possible deformation (reduction in height) of the annular protuberances will be 2% of the diameter of the ring or band although in practice some of the contraction of the memory metal will be taken up by tolerances in the manufacture of the shell members and rings in order to be able to position the rings about the shell members. This device is preferably arranged so that the annular protuberances deform by at least 0.5% of the diameter of the ring or band.

The shell members may also, if desired, be provided with other zones of weakness, such as the slots and flats discussed in British Patent Specification No. 1,488,393 so as to facilitate their deformation when the bands or rings recover, although it is preferred that substantially no deformation of the shell members other than that of the annular protuberances occurs when the bands or rings recover.

The material of the shell members will be chosen according to the application but, in the preferred embodiments of the present invention, they will be made from an electrically conductive metal such as copper, brass or aluminium and may be plated, e.g. with silver. The use of copper shell members is especially preferred for compatibility reasons when, as in the preferred embodiments of the present invention, heat shrinkable metal bands are made from preconditioned $\beta$-brass alloys.

For electrical connections, cross-sectional area of the insert is preferably at least 70%, especially at least 80%, of the cross-sectional area of the conductor to ensure adequate current-carrying capacity without generation or excessive heat. This is particularly desirable where the device is to be used for connecting bus bars in electrical switch-gear since currents of up to, and even greater than, 2500 A and voltages typically of 11 kV will be experienced.

The metal bands themselves may either be continuous or of broken cross-section, e.g. split rings and are preferably deformed so that they exhibit up to about 4% radial shrinkage. As mentioned about they are most preferably made from preconditioned $\beta$-brass alloys and exhibit initial transition temperatures which are well in excess of room temperature so as to preclude the possibility of premature recovery during storage. Typically they will have a transition temperature of about 100° C. so that they can readily be caused to recover by the application of a conventional torch or hot air gun.

In many applications, for example in the electrical connection of bus bars as described above, it will be appropriate to provide at least one insulating layer over the connection which has been made. Especially suitable materials in this respect are heat shrinkable cross-linked polymeric materials which may suitably include fillers so as to give them the necessary stress grading properties and provide both the necessary insulation and satisfactory discharge and impulse performance. In general it will be appropriate to provide at least two additional sleeving layers for the purpose.

According to a preferred design each shell member has a region at each end thereof which is adapted to receive a ring or band, each of said regions having a lower external profile than the portion of that shell member in between the said regions. Advantageously the central portion of each shell member, that is, the portion between the ends of the shell member, is relatively thick, for example at least 5 mm and even at least 7 mm, and a region at each end of the shell members over which a heat recoverable rign or band is to be positioned, has an external profile that is at least 2 or even at least 4 mm less than that of the central portion. The preferred design has the advantage that the reduction in external dimensions at the ends of the tubular connection assembly accurately locates and at least partly accommodates the heat recoverable band or ring (which may in some cases have a thickness in excess of 3 and even in excess of 5 mm) so that the assembled connection has a smoother external profile onto which the insulating layer is applied.

Various embodiments of the present invention will now be described in more detail, by way of example only, with reference to the accompanying drawings, in which FIG. 1 shows two bus bars FIG. 2 shows a connector in accordance with the present invention positioned for electrical connection of the bus bars of FIG. 1;

FIG. 3 is a longitudinal cross-section showing a further connector in accordance with the present invention for connection of two bus bars;

FIG. 4b is a sectional elevation taken along the line A—A of FIG. 4a;

Figure 4A:
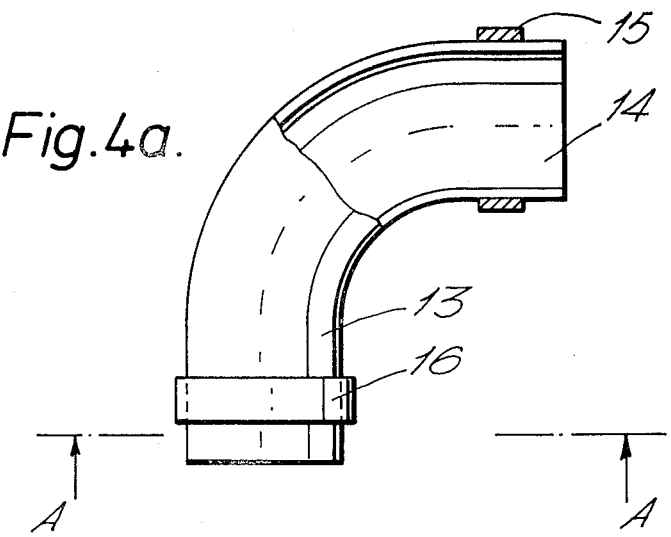
FIG. 4a is a longitudinal section of a further form of connector in accordance with the present invention.

Referring now to the drawings, in FIG. 1 there are shown two bus bars 1 and 2 which are firmly located within epoxy resin mouldings 3 and 4, respectively. Typically the bus bars are solid copper or circular cross-section and silver plated to a thickness of about 0.0005 inches. The gap D1 between the ends of the bus bars 1 and 2 will, of course, very according to the requirements of the switchgear user as indeed will the distance D2 between the epoxy resin mouldings 3 and 4. However, in general, the distances are chosen to be small for compactness of the switchgear unit.

FIG. 2 shows a connector in accordance with the present invention positioned about the bus bars 1 and 2. The connector comprises a composite tubular assembly made from two hollow copper half shells 5 and 6 and, in accordance with the present invention, heat shrinkable metal bands 7 and 8 are provided adjacent the two ends of the tubular assembly.

The connector may conveniently be assembled as follows. The two heat shrinkable metal bands 7 and 8 are first of all located on bus bars 1 and 2 respectively (in the event that the gap D1 between the bus bars 1 and 2 is less than the width of the bands, then it will be necessary for the bands to be positioned on the bus bars before the unit is assembled). The half shells 5 and 6 are then placed around the bus bar joint where upon the metal bands 7 and 8 are slipped into position on to the ends of the half shells.

When this assembly has been completed the metal bands may be caused to shrink by heating them to a temperature at or above the transition temperature of the memory metal from which they are made. When this operation has been completed one or more layers of electrical insulation may be provided over the connection so as to insulate it and provide suitable discharge and impulse performance. Amongst such suitable insulation there may especially be mentioned the heat shrinkable polymeric sleeves sold under the codes CNTM and BBIT by Raychem Limited.

In FIG. 3 a further form of connector is shown in cross-section. In this connector each half shell 9 and 10 is provided as an internal bulge 12 adjacent each end thereof so that the generally tubular assembly produced is in effect provided with an internal annular protuberance at each end. When, as is sometimes the case, the bus bars to be connected are not completely accurately aligned (being offset, for example, by up to 3 mm) the bearing surfaces provided by the internal bulge 12 ensure that a firm electrical connection is nonetheless made, the bulges 12 are themselves deformed and flattened upon shrinkage of the metal bands 7 and 8.

Figure 4B:
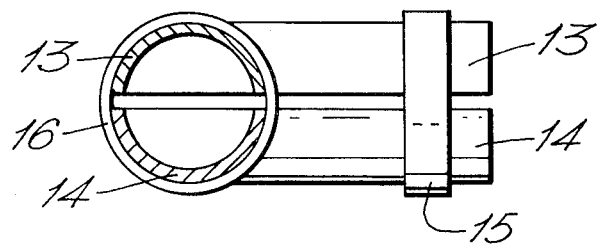

In FIGS. 4a and 4b there is shown a further form of connector in accordance with the present invention in which the shell members and metal bands are in position, the bus bars have been omitted for the sake of clarity. An elbow assembly is formed from two suitably shaped half shells 13 and 14, shrinkable metal bands 15 and 16 being provided on each end of the elbow which is designed to form a connection between, for example, bus bars arranged at right angles to one another.

Figure 5:
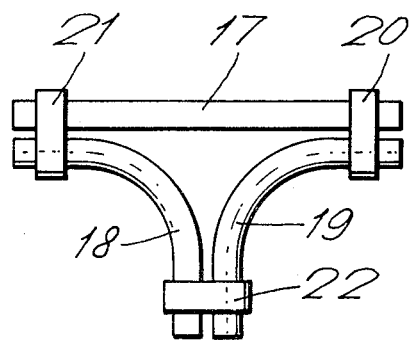
FIG. 5 shows a further form of connector in accordance with the present invention which has a generally T-shaped configuration and FIG. 6 is a longitudinal section through a further form of connector in accordance with the invention.

FIG. 5 shows a connector which is similar in principle but which is designed to form a three-way electrical connection. In this case the tubular assembly is T-shaped and made up from three shell members 17, 18 and 19 with shrinkable metal bands 20, 21 and 22 being provided at the end of each arm of the T-shape assembly.

Typical dimensions for the connector shown in FIGS. 2 and 3 are as follows: Length of copper half shells 50 mm; thickness of copper half shells 3 mm; width of metal bands 12 mm; thickness 2 mm. Such a connector would typically be used to connect bus bars having a diameter of about ¾ inch and in which distance D2 is about 80 mm and distance D1 from about 10 mm to 15 mm.

Figure 6:
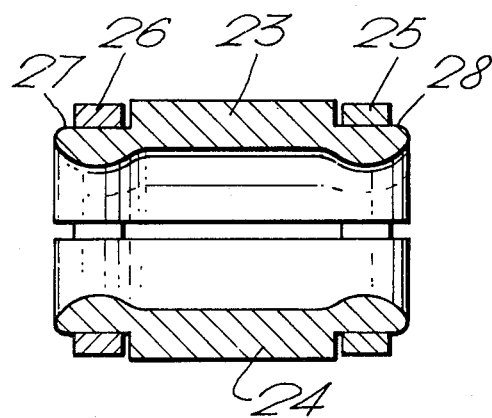

FIG. 6 shows yet a further form of connector in which the shell members and metal rings are in position, the bus bars being omitted for the sake of clarity. The connector is similar to that shown in FIG. 3 and comprises two brass or copper half shells 23 and 24, together forming a generally tubular connection assembly, and two memory metal rings 25 and 26, one ring positioned about each end of the connection assembly. In the device the shells 23 and 24 have a relatively thick portion in between their ends and, in the region of each end, they have a portion 27 and 28 of lower outer profile for accommodating the rings 25 and 26. This device also has a rounded annular internal protruberance at each end so that a good connection may be formed even if the bus bars are not accurately aligned.

In the device shown in FIG. 6, the thickness of the central portion of the shells is typically about 7.5 mm, the height of the protruberance about 1 mm (from the internal surface of the shell), and the outer surface of the central portion of the shell would be raised about 3 mm above the surface of the portions 27 and 28. A device have an internal radius of curvature (at the apex of the protuberances) of about 15 mm and suitable for connecting bus bars of diameter about 29 mm would be provided with rings of internal diameter about 42 mm reducing on free contraction to about 40 mm, thickness from 2.5 to 6 mm and width about 12 mm.

Whilst the present invention has been described herein with particular reference to the formation of electrical connections in switchgear units, it will be appreciated that it will have many applications for connecting other solid or hollow relatively immovable members where the ease of assembly of the connector in situ will help overcome stringent spacial requirements and various modifications and variations falling within the scope of the present invention will be apparent to those skilled in the art.

The following example illustrates the invention:

A number of connection devices similar to that shown in FIG. 6 having solid copper shells plated to a thickness of 0.0125 mm were connected between 1¼ inch bus bars having a gap of 14 mm between their ends, and misaligned by 3 mm. The connections were subjected to a load cycling test in which a current of 1900 A was passed through the bus bars for 90 minutes to raise the temperature of the connection from 40° C. to 105° C. and them switched off for 60 minutes to allow the connection to cool before the cycle was repeated. After 1400 cycles, no adverse effect on the connection could be seen. The voltage drop across the connection varied from 19.9 to 13.25 mV at 1800 A and had not increased significantly since the load cycling was commenced.

I claim:

1. A connector suitable for application connecting at least two substrates in situ comprising:
   a plurality of insert members capable of being positioned to form a generally tubular assembly; at least two substantially convex contact portions on an internal surface of said insert members; and at least two heat shrinkable drivers each sized to be positioned about an external surface of said insert members, each said driver when positioned over said insert members and substantially over said contact portions applying a force substantially over said contact portions and driving said insert members together upon recovery to form an integral structure with said insert members and at least two substrates when said connector is positioned to form a generally tubular assembly.

2. The connector defined in claim 1 wherein two drivers are substantially situated along two planes perpendicular to the longitudinal axis of said connector when said connector is positioned to form a generally tubular assembly about two substrates, said planes being further defined as each having one said contact portion of two said insert members lying substantially along each plane.

3. The connector claimed in claim 2 wherein each said driver is further defined as being sufficiently narrow to be inserted between the ends of fixed substrates in in situ applications.

4. The connector claimed in claim 2 wherein said two drivers are spaced apart so that one driver lies on each side of a gap between the substrates.

5. The connector claimed in claim 3 wherein said two drivers are spaced apart so that one driver lies on each side of a gap between the substrates.

6. The connector defined in claim 2, 3, 4, or 5 wherein said contact portions are more malleable that at least one said substrate.

7. The connector defined in claim 1, 2, 3, 4 or 5 wherein said contact portions are smooth.

8. The connector defined in claim 2, 3, 4 or 5 wherein said contact portions are smooth and more malleable than at least one said substrate.

* * * * *